(12) United States Patent
Zuo

(10) Patent No.: US 11,140,315 B2
(45) Date of Patent: Oct. 5, 2021

(54) METHOD, STORAGE MEDIUM, TERMINAL DEVICE, AND SERVER FOR MANAGING PUSH INFORMATION

(71) Applicant: TENCENT TECHNOLOGY (SHENZHEN) COMPANY LIMITED, Shenzhen (CN)

(72) Inventor: Hongtao Zuo, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 16/800,202

(22) Filed: Feb. 25, 2020

(65) Prior Publication Data

US 2020/0195842 A1 Jun. 18, 2020

Related U.S. Application Data

(63) Continuation of application No. PCT/CN2018/105190, filed on Sep. 12, 2018.

(30) Foreign Application Priority Data

Sep. 12, 2017 (CN) .......................... 201710818173.8

(51) Int. Cl.
*H04N 5/228* (2006.01)
*H04N 5/232* (2006.01)

(52) U.S. Cl.
CPC ..... *H04N 5/23229* (2013.01); *H04N 5/23206* (2013.01); *H04N 5/23218* (2018.08); *H04N 5/23222* (2013.01)

(58) Field of Classification Search
CPC .......... H04N 5/23229; H04N 5/23218; H04N 5/23206; H04N 5/23222
(Continued)

(56) References Cited

U.S. PATENT DOCUMENTS

| 2003/0039380 A1* | 2/2003 | Sukegawa .......... G06K 9/00288 |
| | | 382/118 |
| 2004/0092266 A1* | 5/2004 | Olrik .................. H04L 67/10 |
| | | 455/445 |

(Continued)

FOREIGN PATENT DOCUMENTS

| CN | 105589925 A | 5/2016 |
| CN | 106909270 A | 6/2017 |

(Continued)

OTHER PUBLICATIONS

Korean Intellectual Property Office (KIPO) Office Action 1 for 20207008273 dated Jan. 14, 2021 13 Pages (including translation).

(Continued)

*Primary Examiner* — Usman A Khan
(74) *Attorney, Agent, or Firm* — Anova Law Group, PLLC

(57) ABSTRACT

An information pushing method, a storage medium, a terminal device and a server are provided. The method is performed by the terminal device, including: starting a camera in that the terminal device upon detecting that a preset region in an interaction interface is selected. The interaction interface is displayed on an upper layer of an information display interface, and the information display interface is used for displaying push information. The method also includes transmitting an image captured by the camera to the server; obtaining a processing instruction returned by the server; and updating at least one of the interaction interface or the information display interface according to the processing instruction, including: when the server determines that the image satisfies a preset requirement, stopping displaying the push information on the information display interface according to the processing instruction.

20 Claims, 9 Drawing Sheets

(58) Field of Classification Search
USPC .................................................... 348/222.1
See application file for complete search history.

(56) References Cited

U.S. PATENT DOCUMENTS

| | | | | |
|---|---|---|---|---|
| 2004/0189829 | A1* | 9/2004 | Fukuda | H04N 5/232941 348/239 |
| 2010/0141781 | A1* | 6/2010 | Lu | H04N 5/232 348/222.1 |
| 2011/0050909 | A1* | 3/2011 | Ellenby | G03B 17/24 348/207.1 |
| 2011/0141141 | A1* | 6/2011 | Kankainen | H04N 5/23216 345/632 |
| 2013/0038759 | A1* | 2/2013 | Jo | H04N 5/232945 348/240.99 |
| 2013/0198829 | A1 | 8/2013 | Bund et al. | |
| 2013/0258117 | A1* | 10/2013 | Penov | G06K 9/6202 348/207.1 |
| 2014/0152875 | A1* | 6/2014 | Tobin | H04N 5/23216 348/239 |
| 2015/0124125 | A1* | 5/2015 | Kim | H04N 5/232933 348/239 |
| 2015/0324863 | A1* | 11/2015 | Pugh | G06Q 30/0226 705/14.27 |
| 2016/0156854 | A1 | 6/2016 | Yang et al. | |

FOREIGN PATENT DOCUMENTS

| | | |
|---|---|---|
| CN | 106937043 A | 7/2017 |
| CN | 108429782 A | 8/2018 |
| EP | 2437472 A1 | 4/2012 |
| KR | 20150068509 A | 6/2015 |

OTHER PUBLICATIONS

The World Intellectual Property Organization (WIPO) International Search Report for PCT/CN2018/105190 dated Nov. 28, 2018 5 Pages (including translation).
The State Intellectual Property Office of the People's Republic of China (SIPO) Office Action 1 for 201710818173.8 dated Sep. 4, 2019 8 Pages (including translation).

* cited by examiner

METHOD, STORAGE MEDIUM, TERMINAL DEVICE, AND SERVER FOR MANAGING PUSH INFORMATION

CROSS-REFERENCE TO RELATED APPLICATIONS

This application is a continuation application of PCT Patent Application No. PCT/CN2018/105190, filed on Sep. 12, 2018, which claims priority to Chinese Patent Application No. 201710818173.8, entitled "INFORMATION PUSHING METHOD, APPARATUS, TERMINAL, AND SERVER" filed with the Chinese Patent Office on Sep. 12, 2017, the entire contents of both of which are incorporated herein by reference.

FIELD OF THE TECHNOLOGY

The present disclosure relates to the field of communications technologies, and in particular, to an information pushing method, a storage medium, a terminal device and a server.

BACKGROUND OF THE DISCLOSURE

Currently, with the development of network communications and computer technologies, mobile terminals are widely used. An increasing number of users can watch videos and listen to music through a network by using mobile terminals. Meanwhile, an increasing number of enterprises hope to push information, such as a product advertisement, to a user while the user watches videos or listens to music, to increase an exposure of a product of the enterprise.

However, the existing information pushing method has a poor information push effect, users have low awareness of push information, and information push has low value, causing network resource waste and low communication efficiency.

SUMMARY

Embodiments of the present disclosure provide an information pushing method, a terminal, a server, and a storage medium, to provide a flexible interaction mechanism in an information pushing process, thereby improving interactivity between an information pushing process and a user and improving push effects of push information.

One aspect of the present disclosure provides an information pushing method, performed by a terminal device. The method includes: starting a camera in the terminal device upon detecting that a preset region in an interaction interface is selected. The interaction interface is displayed on an upper layer of an information display interface, and the information display interface is used for displaying push information. The method also includes transmitting an image captured by the camera to the server; obtaining a processing instruction returned by the server; and updating at least one of the interaction interface or the information display interface according to the processing instruction, including: when the server determines that the image satisfies a preset requirement, stopping displaying the push information on the information display interface according to the processing instruction.

Another aspect of the present disclosure provides an information pushing method, performed by server, the method including: obtaining an image transmitted by an information pushing client; parsing the image according to a type of push information currently displayed by the information pushing client, to obtain target data from the image; generating a processing instruction according to the target data; and returning the processing instruction to the information pushing client.

Another aspect of the present disclosure provides a terminal device, including: a memory, a processor, and a camera. The processor is configured to: start the camera upon detecting that a preset region in an interaction interface is selected. The interaction interface is displayed on an upper layer of an information display interface, and the information display interface is used for displaying push information. The processor is also configured to transmit an image captured by the camera to the server; obtain a processing instruction returned by the server; and update at least one of the interaction interface or the information display interface according to the processing instruction, including: when the server determines that the image satisfies a preset requirement, stopping displaying the push information on the information display interface according to the processing instruction.

Another aspect of the present disclosure provides a non-transitory storage medium, storing computer executable instructions. The computer executable instructions, when being executed by a processor of a terminal device, causing the terminal device to perform: starting a camera in the terminal device upon detecting that a preset region in an interaction interface is selected. The interaction interface is displayed on an upper layer of an information display interface, and the information display interface is used for displaying push information. The computer instructions also cause the processor to perform: transmitting an image captured by the camera to the server; obtaining a processing instruction returned by the server; and updating at least one of the interaction interface or the information display interface according to the processing instruction, including: when the server determines that the image satisfies a preset requirement, stopping displaying the push information on the information display interface according to the processing instruction.

BRIEF DESCRIPTION OF THE DRAWINGS

To describe the technical solutions in embodiments of the present disclosure more clearly, the following briefly describes the accompanying drawings required for describing the embodiments. Apparently, the accompanying drawings in the following description show merely some embodiments of the present disclosure, and a person of ordinary skill in the art may derive other drawings from these accompanying drawings without creative efforts.

DESCRIPTION OF EMBODIMENTS

Exemplary embodiments are described in detail herein, and the embodiments are illustratively shown in the accompanying drawings. When the following descriptions relate to the accompanying drawings, unless otherwise indicated, same numbers in different accompanying drawings represent same or similar elements. The implementations described in the following exemplary embodiments do not represent all implementations consistent with the present disclosure. On the contrary, the implementations are merely examples of apparatuses and methods that are described in detail in the appended claims and that are consistent with some aspects of the present disclosure.

To solve the problems that the existing information pushing method has a poor information push effect, users have low awareness of push information, and information push has low value, the embodiments of the present disclosure provide an information pushing method.

Figure 1A:
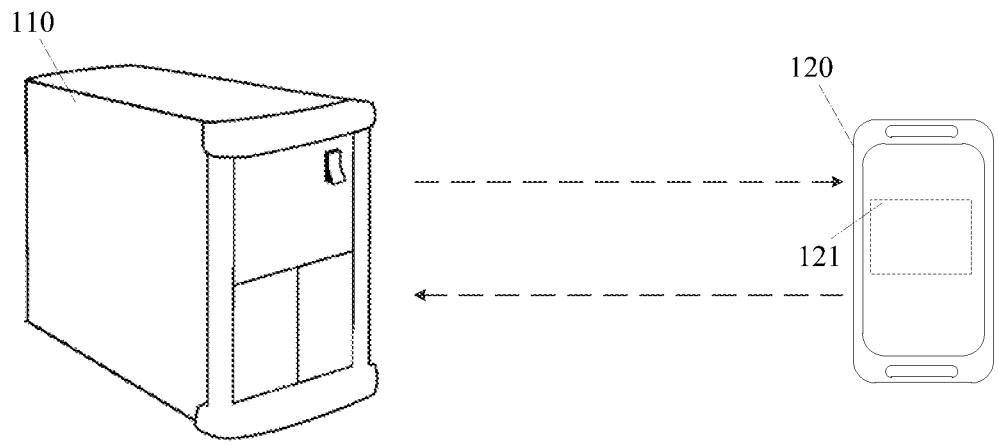
FIG. 1A is an architecture diagram of a system to which an information pushing method is applied according to an exemplary embodiment.

The information pushing method provided in the embodiments of the present disclosure may be performed by a system shown in FIG. 1A. The system includes a terminal device 120 and a server 110. The terminal device 120 herein may communicate with the server 110 by using a network (not shown in FIG. 1A). The network may be various communications networks such as a local area network or a wide area network. The terminal device may be, for example, an intelligent device such as a desktop computer, a tablet personal computer, a notebook computer, or a mobile phone. The terminal device 120 may include an information pushing client 121. The information pushing client 121 may be various clients capable of presenting push information, such as a browser, a video playback client, a short video client, an instant messaging client, and a social networking client. In some embodiments, the push information may be configured to be displayed for a preset duration (e.g., 30 second). The server 110 may be a server node, or may be a server cluster including a plurality of server nodes. When the information pushing client 121 pushes information to a user, the system can provide a flexible interaction mechanism through interaction between the information pushing client 121 and the server 110, thereby improving interactivity between an information pushing process and the user. In this way, the information pushing method of the embodiments of the present disclosure enhances the user's awareness of push information, enriches the diversity of information push forms, and improves push effects and value of the push information.

The information pushing client 121 and the server 110 that are shown in FIG. 1A are merely exemplary descriptions, and cannot be constructed as a limitation to the solutions provided in the embodiments of the present disclosure.

In the information pushing method provided in the embodiments of the present disclosure, in response to determining that a preset region in an interaction interface is selected (e.g., touched), the information pushing client 121 starts a camera in the terminal device 120, and then transmits an image captured by the camera to the server 110. After obtaining the image transmitted by the information pushing client 121, the server 110 may parse the image according to a type of push information currently displayed by the information pushing client 121, to obtain target data included in the image, generate a processing instruction according to the target data, and then return the processing instruction to the information pushing client 121. After obtaining the processing instruction returned by the server 110, the information pushing client 121 may update at least one of the interaction interface and an information display interface according to the processing instruction. In some embodiments, when the server determines that the image satisfies a preset requirement before a countdown of the preset duration (i.e., the preset duration originally designated for displaying the push information) ends, the terminal device may stop displaying the push information on the information display interface according to the processing instruction. In some embodiments, when the server determines that the image does not satisfy the preset requirement, the push information is displayed until the countdown of the preset duration ends. For example, when the countdown of the preset duration ends, i.e., when the push information has been displayed for its corresponding playback duration, the terminal device may close the interaction interface and the information display interface according to the processing instruction. Therefore, in the embodiments of the present disclosure, a flexible interaction mechanism is provided during information push. In this way, by means of interaction with a user, the embodiments of the present disclosure enhances the user's awareness of push information, enriches the diversity of information push forms, and improves push effects and value of the push information.

The information pushing method and apparatus, the terminal, and the server provided in the present disclosure are described in detail below with reference to the accompanying drawings.

First, the side of the information pushing client 121 is used as an example to specifically describe the information pushing method provided in the embodiments of the present disclosure.

Figure 1B:
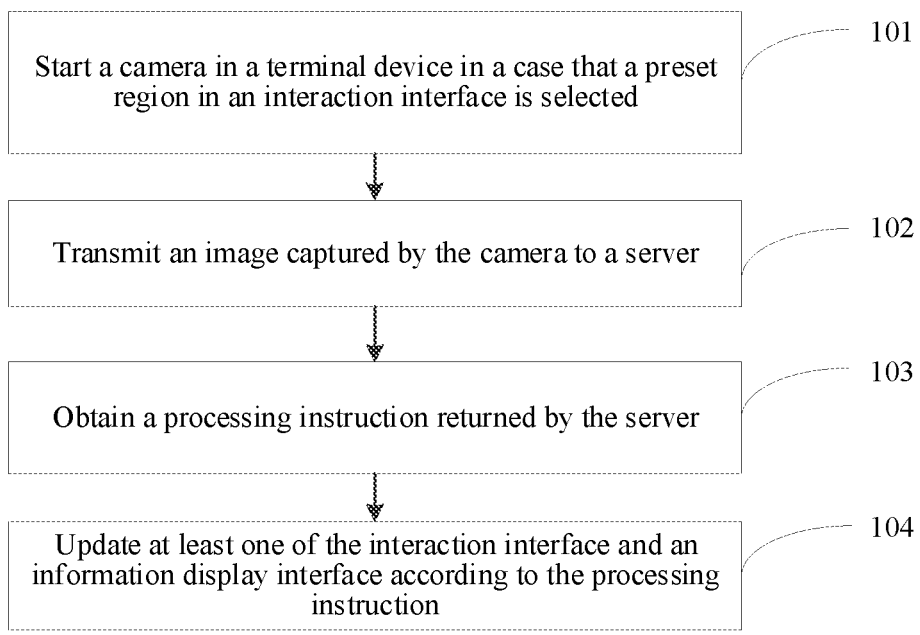
FIG. 1B is a schematic flowchart of an information pushing method according to an exemplary embodiment.

FIG. 1B is a schematic flowchart of an information pushing method according to an exemplary embodiment.

As shown in FIG. 1B, the information pushing method is performed by the terminal device 120. The terminal device may include the information pushing client 121. The information pushing method may be performed by the information pushing client 121 in the terminal device 120. Step 101. Start a camera in the terminal device in a case that a preset region in an interaction interface is selected. In other words, in step 101, the camera in the terminal device 120 is started in response to a touch operation in the preset region in the interaction interface. In some embodiments, the interaction interface is displayed on an upper layer of an information display interface, and the information display interface is used for displaying push information. The push information may be, for example, information such as an advertisement and news. For example, the push information is a video advertisement played on the information display interface of the terminal device 120. In some embodiments, the push information may be configured to be displayed for a preset duration (e.g., 30 second). For example, the advertisement may be a video or a flash that lasts for 30 seconds.

The preset region may be a region of any size, any shape, or any location in the interaction interface.

The selection operation may be an operation performed by the user in the preset region, such as touching, clicking, long pressing, or sliding, which is not limited herein.

The camera in the terminal device 120 may be a built-in camera or an external camera of the terminal device 120. For example, a front-facing camera or a rear-facing camera, which is not limited herein.

Specifically, in some embodiments, in response to determining that the preset region in the interaction interface is selected, the information pushing client 121 may directly start the camera in the terminal device 120. In some embodiments, it is also feasible that when the information pushing client 121 is installed or used for the first time, the user defines whether the information pushing client 121 has the permission to start the camera in the terminal device 120, so that when the information pushing client has the permission, the camera in a terminal in which the client is located is started in response to determining that the preset region in the interaction interface is selected. In some embodiments, the information pushing client 121 may further display, in response to determining that the preset region in the interaction interface is selected, a message for confirming whether to start the camera in the terminal device 120 to the user. In this way, after the user confirms, the camera in the terminal device 120 is started.

In some embodiments, the push information displayed on the information display interface may be transmitted by the server 110. That is, before step 101, the method may further include:

receiving a push instruction transmitted by the server 110, the push instruction including the push information and a type corresponding to the push information; and determining a target display mode of the interaction interface according to the type of the push information; and displaying the push information on the information display interface, and displaying the interaction interface on an upper layer of the information display interface according to the target display mode.

The type of the push information may be text, an image, and the like. The image, for example, may include a human face and an image contour.

The target display mode may include a display position, a display size, and transparency of the interaction interface.

In the interaction interface, the information pushing method may further include: displaying prompt information on the interaction interface, where the prompt information, for example, may include: a photographing operation to be performed and an effect after the photographing operation is completed. For example, in the interaction interface shown in FIG. 1C, "take a picture of 'xxx envelope' to skip advertisements" may be displayed. Also, if the advertisement has a predetermined display duration, a countdown of the duration may be shown. For example, the interaction interface may display "take a picture of 'Dior envelope' to skip the current advertisement". For another example, the interaction interface may display information such as "take a picture of 'KFC logo' to have a chance to obtain a coupon". In other words, when the photographing operation prompted by the prompt information is taking a picture of a Dior envelope, the effect after the photographing operation is completed is skipping the current advertisement (that is, closing the current push information). When the photographing operation prompted by the prompt information is taking a picture of KFC logo, the effect after the photographing operation is completed is "having a chance to obtain a coupon". In addition, the interaction interface may be displayed as non-transparent, semi-transparent, or transparent.

In some embodiments, the information pushing client 121 may preset display priority levels of the interaction interface and the information display interface, so that the interaction interface is displayed on the upper layer of the information display interface, to implement interaction with the user in an information pushing process.

In a specific implementation, a correspondence between types of push information and target display modes of the interaction interface may be preset, so that after obtaining the push instruction transmitted by the server 110, the information pushing client 121 may determine the target display mode of the interaction interface according to the type of the push information and the preset correspondence, to further display the push information on the information display interface and display the interaction interface in the target display mode on the upper layer of the display interface.

For example, it may be preset that when the type of the push information is text, the corresponding target display mode is as follows: the transparency is 50%, the size is 10% of the information display interface, and the interaction interface is displayed in the right area in the middle of the information display interface; and when the type of the push information is a human face, the corresponding target display mode is as follows: the transparency is 40%, the size is 5% of the information display interface, and the interaction interface is displayed in the lower right corner area of the information display interface. In this way, after the push instruction transmitted by the server is received, the target display mode of the interaction interface may be determined according to the type of the push information included in the push instruction, so that the interaction interface is displayed on the upper layer of the information display interface in a form shown in FIG. 1C.

Step 102. Transmit an image captured by the camera to the server 110.

Step 103. Obtain a processing instruction returned by the server 110.

Step 104. Update at least one of the interaction interface and the information display interface according to the processing instruction.

Specifically, after the information pushing client 121 starts the camera in the terminal device 120 according to the touch operation of the user in the preset region in the interaction interface, the user may capture a corresponding image by using the camera according to the information displayed on the interaction interface. The information pushing client 121 may transmit the image captured in real time to the server 110, so that the server 110 parses the image according to the type of the push information to obtain target data included in the image, further generates a processing instruction according to the target data, and returns the processing instruction to the information pushing client 121. In some embodiments, the server may determine whether the image satisfies a preset requirement, and generate the processing instruction based on the determination result.

The preset requirement may include, for example, the image containing specific contents such as certain text or pattern, the image containing a face image matching a preset face in a library on the server, the image containing a barcode or QR code that embeds information matching prestored information in the server. When the image satisfies the preset requirement, the processing instruction may include displaying a message indicating a successful operation, and/or skipping displaying the push information before its designated display duration ends. When the image does not satisfy the preset requirement, the processing instruction may include displaying a message indicating unsuccessful operation, and/or continuing displaying the push information based on its original countdown and preset duration. After obtaining the processing instruction returned by the server 110, the information pushing client 121 may update at least one of the interaction interface and the information display interface according to the processing instruction.

Specifically, at least one of the interaction interface and the information display interface may be processed in the following manner. That is, step 104 may include:

updating the interaction interface according to the processing instruction; or closing the interaction interface and the information display interface according to the processing instruction.

It may be understood that the processing instruction returned by the server 110 may be a processing instruction for the interaction interface, for example, displaying a picture of lottery, a picture of celebrity interaction, and a message indicating that an operation is successful. After the processing instruction returned by the server is obtained, the interaction interface may be updated according to the processing instruction. For example, in step 104, the message indicating that an operation is successful may be displayed on the interaction interface. Alternatively, the processing instruction may also be an instruction for the interaction interface and the information display interface, for example, skipping an advertisement. After the processing instruction returned by the server is obtained, the interaction interface and the information display interface may be closed.

In the information pushing method provided in the embodiments of the present disclosure, the camera in the terminal in which the client is located is first started in response to determining that the preset region in the interaction interface is selected, the image captured by the camera is then transmitted to the server, then the processing instruction returned by the server is obtained, and finally at least one of the interaction interface and the information display interface is processed according to the processing instruction. In this way, during information push, by means of interaction with a user, the user's awareness of push information is enhanced, the diversity of information push forms is enriched, and push effects and value of the push information are improved.

It can be learned from the foregoing analysis that the camera in the terminal in which the client is located may be started in a case that the preset region in the interaction interface is selected, to capture an image and transmit the captured image to the server. After the processing instruction returned by the server is obtained, at least one of the interaction interface and the information display interface may be processed according to the processing instruction. In an actual application, after transmitting the image captured by the camera to the server, the information pushing client may not receive the processing instruction returned by the server. The information pushing method provided in the embodiments of the present disclosure is further described below with reference to FIG. 2.

Figure 2:
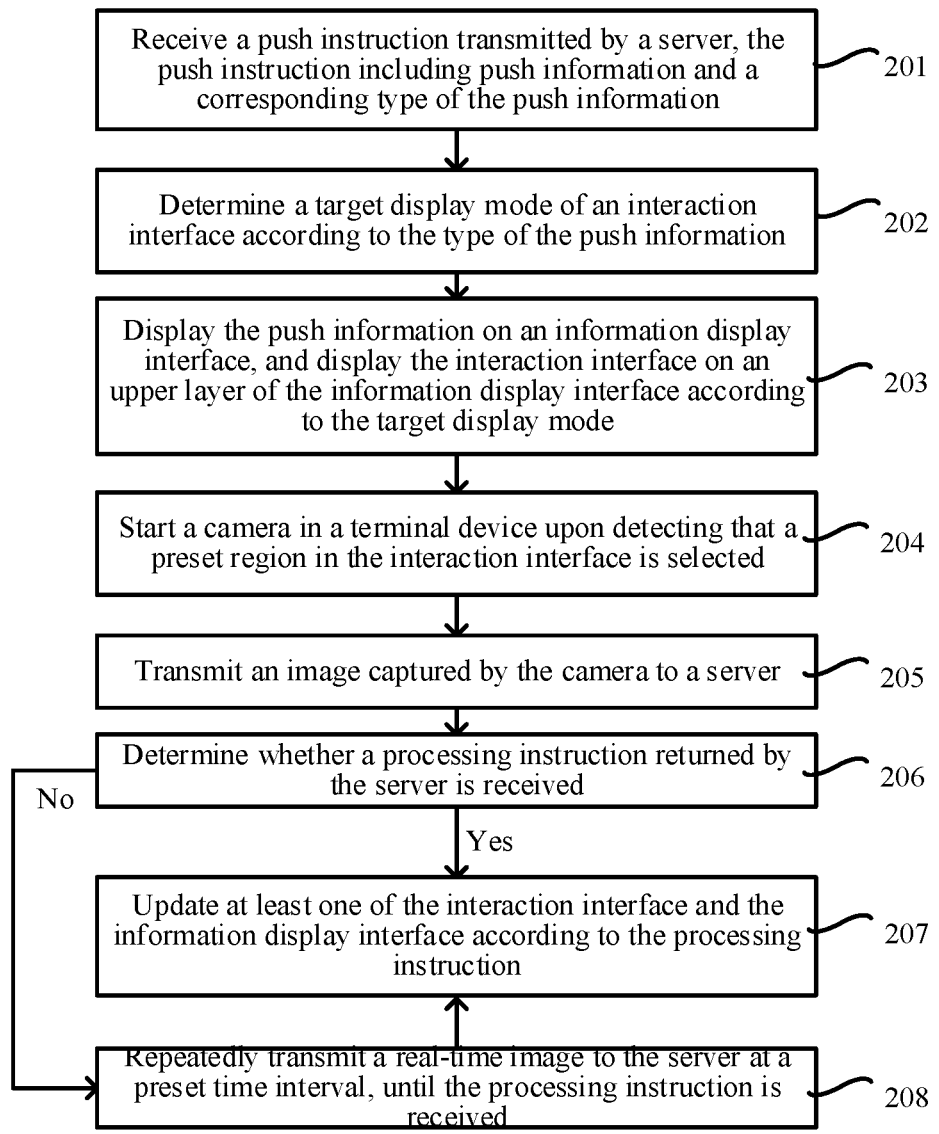
FIG. 2 is a schematic flowchart of an information pushing method according to another exemplary embodiment.

FIG. 2 is a schematic flowchart of an information pushing method according to another exemplary embodiment.

As shown in FIG. 2, the information pushing method is performed by the information pushing client 121 in the terminal device 120, and may include the following steps:

Step 201. Receive a push instruction transmitted by a server 110, the push instruction including push information and a type corresponding to the push information.

Step 202. Determine a target display mode of an interaction interface according to the type of the push information.

Step 203. Display the push information on an information display interface, and display the interaction interface on an upper layer of the information display interface according to the target display mode.

Step 204. Start a camera in the terminal device 120 in a case that a preset region in the interaction interface is selected.

The interaction interface is displayed on the upper layer of the information display interface, and the information display interface is used for displaying push information.

Step 205. Transmit an image captured by the camera to the server 110.

Step 206. Determine whether a processing instruction returned by the server is received; if yes, perform step 207; otherwise, perform step 208.

Step 207. Process at least one of the interaction interface and the information display interface according to the processing instruction.

Step 208. Repeatedly transmit a follow-up image captured by the camera in real time to the server at a preset time interval, until the processing instruction returned by the server is received. For example, after the first image is captured and sent to the server, the terminal device may continue to capture a follow-up image every 0.5 second and send the captured image to the server.

For a specific implementation process and principle of step 201 to step 207, reference may be made to the specific descriptions of step 101 to step 104 in the foregoing embodiment, and the details will not be repeated herein.

The preset time interval may be determined as required. For example, the preset time interval may be preset to a fixed value, or may be set according to a network environment in which the information pushing client 121 and the server 110 are located, the type of the information pushing client, and the like, which are not limited herein.

Specifically, if no processing instruction returned by the server is received after the information pushing client transmits the image captured by the camera in real time to the server, the information pushing client may repeatedly transmit the image to the server at the preset time interval, until the server returns the processing instruction, so that the information pushing client processes at least one of the interaction interface and the information display interface according to the processing instruction. In this way, a success rate of transmitting an image to the server is improved.

It may be understood that, after transmitting the image captured by the camera in real time to the server 110, the information pushing client 121 may receive a failure message or an operation timeout message returned by the server 110. In this case, the information pushing client may display information indicating that an operation fails or an operation times out on the interaction interface, to prompt the user that the operation fails or the operation times out. In some embodiments, the information pushing client 121 may receive a message indicating that an operation fails returned by the server 110. The information pushing client 121 may further perform the following step: displaying the message indicating that an operation fails on the interaction interface.

In some embodiments, the information pushing client 121 may receive a message indicating that an operation of the server 110 times out. The information pushing client 121 may further perform the following step: displaying the message representing that an operation of the server times out on the interaction interface.

In addition, to increase the speed at which the image captured by the camera is transmitted to the server and reduce bandwidth occupied in the transmitting process, in some embodiments of the present disclosure, alternatively, the image captured by the camera may be processed first and then transmitted to the server. That is, before step 205, the method may further include:

performing coding compression on the image captured by the camera.

Specifically, lossless data compression methods such as run-length encoding and an entropy coding method may be used, or lossy data compression methods such as transform coding, fractal compression, and chroma subsampling may also be used for performing coding compression on the image captured by the camera. This is not limited herein.

In addition, the image captured by the camera is generally YUV data. In some embodiments of the present disclosure, the YUV data may be converted into RGB data, and the definition is processed in the conversion process, to reduce bandwidth costs of transmission over a network.

In the information pushing method provided in some embodiments of the present disclosure, the push instruction transmitted by the server 110 is received, the push information in the push instruction is displayed on the information display interface, and the interaction interface is displayed in the target display mode that is determined according to the type of the push information. After that, the camera in the terminal device 120 may be started in response to determining that the preset region in the interaction interface is selected, the image captured by the camera is then transmitted to the server 110. If the processing instruction returned by the server 110 is received, at least one of the interaction interface and the information display interface is processed according to the processing instruction; and if the processing instruction returned by the server 110 is not received, the image captured by the camera in real time is then repeatedly transmitted to the server 110 at the preset time interval. In this way, during information push, by means of interaction with a user, the information pushing method of the present disclosure enhances the user's awareness of push information, enriches the diversity of information push forms, and improves push effects and value of the push information.

The server side is used as an example to specifically describe the information pushing method provided in the embodiments of the present disclosure.

Figure 3:
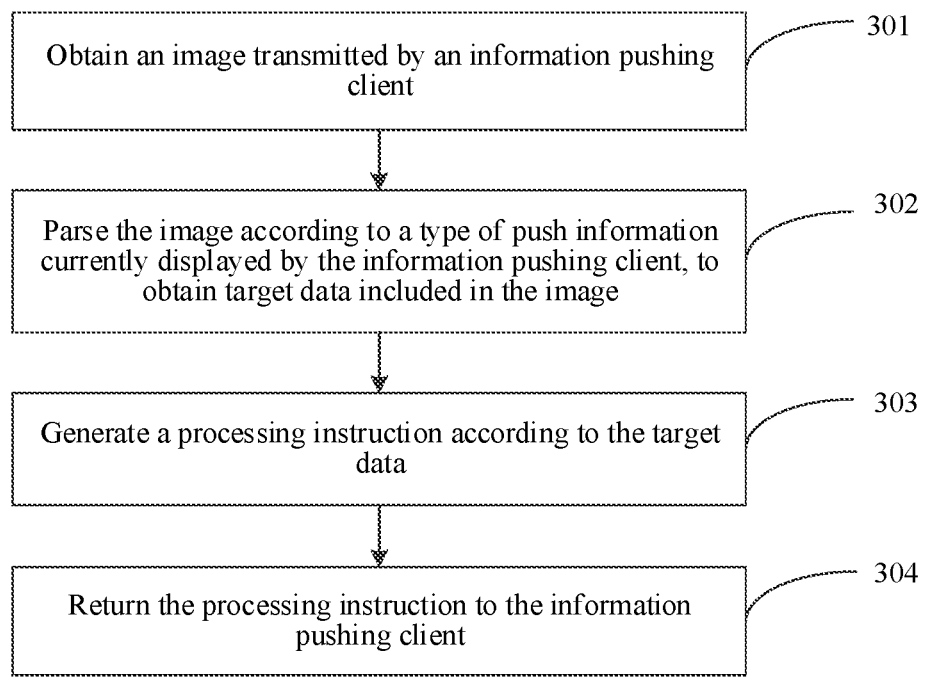
FIG. 3 is a schematic flowchart of an information pushing method according to another exemplary embodiment.

FIG. 3 is a schematic flowchart of an information pushing method according to another exemplary embodiment.

As shown in FIG. 3, the information pushing method is performed by a server 110, and may include the following steps:

Step 301. Obtain an image transmitted by an information pushing client 121.

The information pushing method provided in some embodiments of the present disclosure may be performed by an information pushing apparatus provided in some embodiments of the present disclosure. The apparatus may be configured in the server 110, to implement information push.

Specifically, in response to determining that a preset region in an interaction interface is selected, the information pushing client 121 may start a camera in a terminal in which the client is located, to capture an image by using the camera and transmit the captured image to the server 110, so that the server 110 obtains the image transmitted by the information pushing client.

Step 302. Parse the image according to a type of push information currently displayed by the information pushing client 121, to obtain target data included in the image. In other words, in step 302, the image may be parsed according to the type of the push information, to obtain the target data from the image. The push information may be, for example, information such as an advertisement and news.

The type of the push information may include text, an image, and the like. The image, for example, may include a human face and an image contour.

It may be understood that, the push information currently displayed by the information pushing client may be push information transmitted by the server 110 to the information pushing client 121. That is, before step 301, the method may further include:

transmitting a push instruction to the information pushing client 121, the push instruction including the push information and the type of the push information.

In a specific implementation, the type corresponding to the push information may be determined in advance according to content of the push information, so that the push instruction including the push information and the type of the push information is transmitted to the information pushing client 121, to cause the information pushing client to display the push information and the interaction interface.

Specifically, the type of the push information may be determined according to a ratio of each type of content in the content of the push information.

For example, a type corresponding to content with the largest ratio in the content of the push information may be preset as the type corresponding to the push information. For example, the push information includes text that accounts for 30%, a human face that accounts for 60%, and other content that accounts for 10%, and then it may be determined that the type corresponding to the push information is a human face. In this way, the push information and the corresponding human-face type are transmitted to the information pushing client, to cause the information pushing client to display the push information and the interaction interface.

Alternatively, the type of the push information may be determined according to importance of each type of content in the content of the push information.

For example, a type corresponding to the most important content in the content of the push information may be preset as the type corresponding to the push information. For example, the push information includes text that accounts for 30%, a human face that accounts for 60%, and other content that accounts for 10%, and the text is the most important. In this case, it may be determined that the type corresponding to the push information is text. In this way, the push information and the corresponding text type are transmitted to the information pushing client, to cause the information pushing client to display the push information and the interaction interface.

Alternatively, the type of the push information may also be specified by a push information provider.

The foregoing example of determining the type of the push information is merely exemplary descriptions and cannot be used as a limitation to the technical solutions of the present disclosure. On such a basis, a person skilled in the art may arbitrarily set the method for determining the type of the push information as required, which is not limited herein.

The push information currently displayed by the information pushing client 121 is the push information included in the push instruction transmitted by the server 110 to the information pushing client 121. Therefore, the type of the push information currently displayed by the information pushing client may be directly determined according to the push instruction. Alternatively, when transmitting the image captured by the camera to the server 110, the information pushing client 121 may simultaneously transmit the push information currently displayed, so that after obtaining the push information, the server 110 may determine the type of the push information at once. Alternatively, before the server 110 transmits the push instruction to the information pushing client 121, a correspondence between an identification of the information pushing client 121 and the push instruction may be set in advance, so that the information pushing client 121 may transmit its identification to the server 110, to cause the server 110 to determine the type of the push information currently displayed by the information pushing client and parse the image according to the type of the push information to obtain the target data in the image.

Specifically, step 302 may be implemented in the following manner:

determining a target type of to-be-obtained data according to the type of the push information; and parsing the image to obtain target data corresponding to the target type.

It may be understood that the image that is transmitted by the information pushing client 121 and received by the server 110 may include a large amount of data. To improve the speed of obtaining the target data, in some embodiments of the present disclosure, the target type of the to-be-obtained data may be first determined according to the type of the push information, so that after the image is parsed, the target data included in the image may be quickly obtained according to the target type.

For example, it is assumed that the type of the push information is text. In this case, after obtaining the image transmitted by the information pushing client 121, the server 110 may determine that the target type of the to-be-obtained data is text according to the type of the push information, thereby extracting text information from the obtained image. If the type of the push information is a human face, after obtaining the image transmitted by the information pushing client 121, the server 110 may determine that the target type of the to-be-obtained data is a human face according to the type of the push information, thereby extracting human face information from the obtained image.

Step 303. Generate a processing instruction according to the target data.

Specifically, the server 110 may parse the push information in advance, to determine reference data corresponding to the push information, so that after the target data included in the image is obtained, the processing instruction may be generated according to the target data and the reference data.

That is, before step 303, the method may further include:

parsing the push information to determine reference data corresponding to the push information.

Correspondingly, step 303 may include:

generating the processing instruction according to a matching degree between the target data and the reference data.

The processing instruction is used for instructing the information pushing client to update at least one of the interaction interface and the information display interface.

Specifically, the reference data corresponding to the push information may be determined according to a key degree of the data, an expectation of the push information provider, and the like in the push information. In this way, after the image is parsed and the target data included in the image is obtained, the target data may be compared with the reference data, to generate the processing instruction according to the matching degree between the target data and the reference data.

If the type corresponding to the push information is text, it needs to be compared whether the target data is consistent with the reference data, or whether the target data and the reference data are in an inclusion relation. If the type corresponding to the push information is a human face, it needs to be compared whether image fingerprint information of the target data is consistent with image fingerprint information of the reference data. If the two are consistent, the processing instruction may be generated.

In addition, in some embodiments of the present disclosure, a matching degree threshold may be preset, and it is set that when the matching degree between the target data and the reference data is greater than the preset threshold, the processing instruction is generated. For example, it may be preset that when the matching degree between the target data and the reference data is greater than 80%, the processing instruction is generated. In this way, if the matching degree between the target data and the reference data is 85%, the processing instruction may be generated.

Step 304. Return the processing instruction to the information pushing client 121.

Specifically, after generating the processing instruction, the server 110 may return the processing instruction to the information pushing client 121, to cause the information pushing client 121 to update at least one of the interaction interface and the information display interface according to the processing instruction.

It may be understood that if the server determines that the target data does not match the reference data, or the matching degree is less than the preset threshold, the server may return a failure message to the information pushing client, so that the information pushing client displays information indicating that an operation fails on the interaction interface, to prompt the user that the operation fails. In some embodiments, when it is determined that the target data does not match the reference data, the server generates a message indicating that an operation fails and returns the message to the client.

Alternatively, the server may also return a failure message to the information pushing client when it is determined that the number of times that the target data does not match the reference data reaches a particular value, or the number of times that the matching degree is less than the preset threshold reaches a particular value, or the target data does not match the reference data or the matching degree is less than the preset threshold within a preset time, so that the information pushing client displays operation failure information on the interaction interface, to prompt the user that the operation fails.

Alternatively, when the server fails to complete comparison between the target data and the reference data within a preset time due to a network cause or other causes, the server may further return an operation timeout message to the information pushing client, so that the information pushing client displays operation timeout information on the interaction interface, to prompt the user that the operation times out. In some embodiments, when the server fails to determine the matching degree between the target data and the reference data within a preset time, the server generates a message indicating that an operation of the server times out and returns the message to the client.

In the information pushing method provided in some embodiments of the present disclosure, the image transmitted by the information pushing client is obtained first, the image is parsed according to the type of the push information currently displayed by the information pushing client, to obtain the target data included in the image, then the processing instruction is generated according to the target data, and finally the processing instruction is returned to the information pushing client. In this way, during information push, by means of interaction with a user, the user's awareness of push information is enhanced, the diversity of information push forms is enriched, and push effects and value of the push information are improved.

Figure 4A:
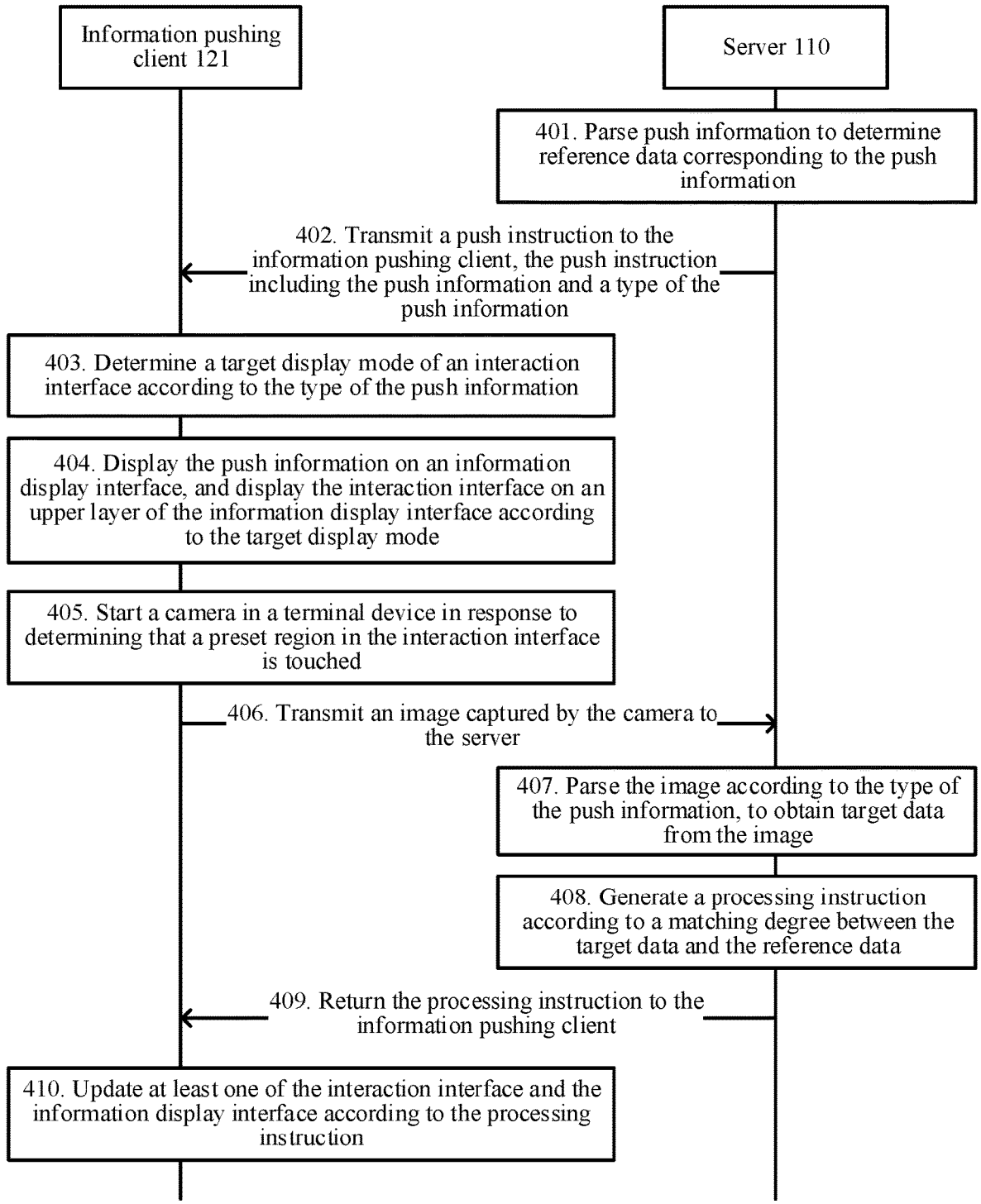
FIG. 4A is a diagram of signaling interaction of an information pushing method according to an exemplary embodiment.

FIG. 4A is a diagram of signaling interaction of an information pushing method according to an exemplary embodiment.

As shown in FIG. 4A, the information pushing method may include the following steps:

Step 401. A server 110 parses push information to determine reference data corresponding to the push information.

Step 402. The server 110 transmits a push instruction to an information pushing client, the push instruction including the push information and a type of the push information.

Step 403. The information pushing client 121 determines a target display mode of an interaction interface according to the type of the push information.

Step 404. The information pushing client 121 displays the push information on an information display interface, and displays the interaction interface on an upper layer of the information display interface according to the target display mode.

Step 405. The information pushing client starts a camera in the terminal device 120 in response to determining that a preset region in the interaction interface is selected.

The interaction interface is displayed on the upper layer of the information display interface, and the information display interface is used for displaying push information.

Step 406. The information pushing client 121 transmits an image captured by the camera to the server 110.

Step 407. The server 110 parses the image according to the type of the push information currently displayed by the information pushing client 121, to obtain target data from the image.

Step 408. The server 110 generates a processing instruction according to a matching degree between the target data and the reference data.

Step 409. The server 110 returns the processing instruction to the information pushing client.

Step 410. The information pushing client 121 processes at least one of the interaction interface and the information display interface according to the processing instruction.

For a specific implementation process and principle of step 401 to step 410, reference may be made to the specific descriptions of the foregoing embodiments, and details will not be repeated herein.

Specifically, the server 110 may transmit the push instruction to the information pushing client 121, where the push instruction includes the push information and the type of the push information. After receiving the push instruction, the information pushing client may determine the target display mode of the interaction interface according to the type of the push information, thereby displaying the push information on the information display interface, and displaying the interaction interface on the upper layer of the information display interface according to the target display mode.

In response to determining that the preset region in the interaction interface is selected, the information pushing client 121 may start the camera in the terminal device 120 to capture an image, and then transmit the image captured by the camera to the server 110. After receiving the image captured by the camera, the server 110 may parse the image according to the type of push information, to obtain the target data included in the image, generate the processing instruction according to the target data, and then return the processing instruction to the information pushing client 121. After receiving the processing instruction returned by the server 110, the information pushing client 121 may update at least one of the interaction interface and the information display interface according to the processing instruction.

Figure 1C:
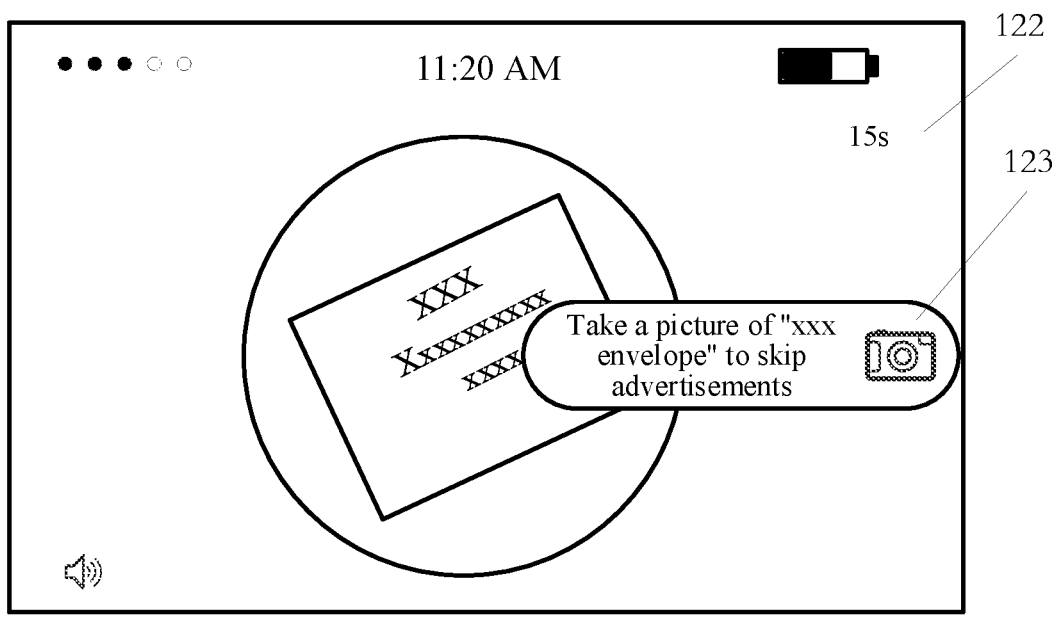
FIG. 1C is a diagram of a display example of an information display interface and an interaction interface according to an exemplary embodiment.

For example, it is assumed that the information display interface and the interaction interface in the information pushing client are as shown in FIG. 1C, where the type of the push information is text and the reference data is data corresponding to the Dior envelope.

When it is determined that a photographing button in the rightmost area in the interaction interface is selected, the information pushing client may start the camera in the terminal device 120 to capture an image, and then transmit the image captured by the camera to the server 110.

After receiving the image captured by the camera, the server 110 may extract text information in the image, and compare the extracted text information with the data corresponding to the Dior envelope. If the extracted text information matches the data corresponding to the Dior envelope, a processing instruction instructing to close the information display interface and the interaction interface may be generated, and the processing instruction is transmitted to the information pushing client 121.

Figure 4B:
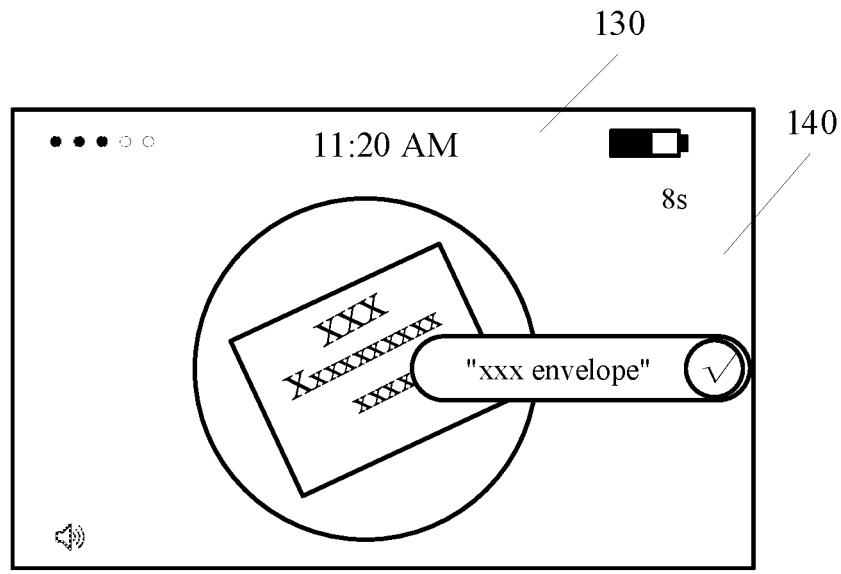
FIG. 4B is a diagram of a display example of an information display interface and an interaction interface according to another exemplary embodiment.

After obtaining the processing instruction returned by the server 110, as shown in FIG. 4B, the information pushing client 121 may display, on the interaction interface 123, a message indicating that the extracted text information successfully matches the data corresponding to the Dior envelope. At this time, although the countdown of the preset duration of the advertisement has not reached the end, the information push client 121 may skip playing the currently shown advertisement. In some embodiments, the information display interface 122 and the interaction interface 123 may be closed according to the processing instruction.

Figure 4C:
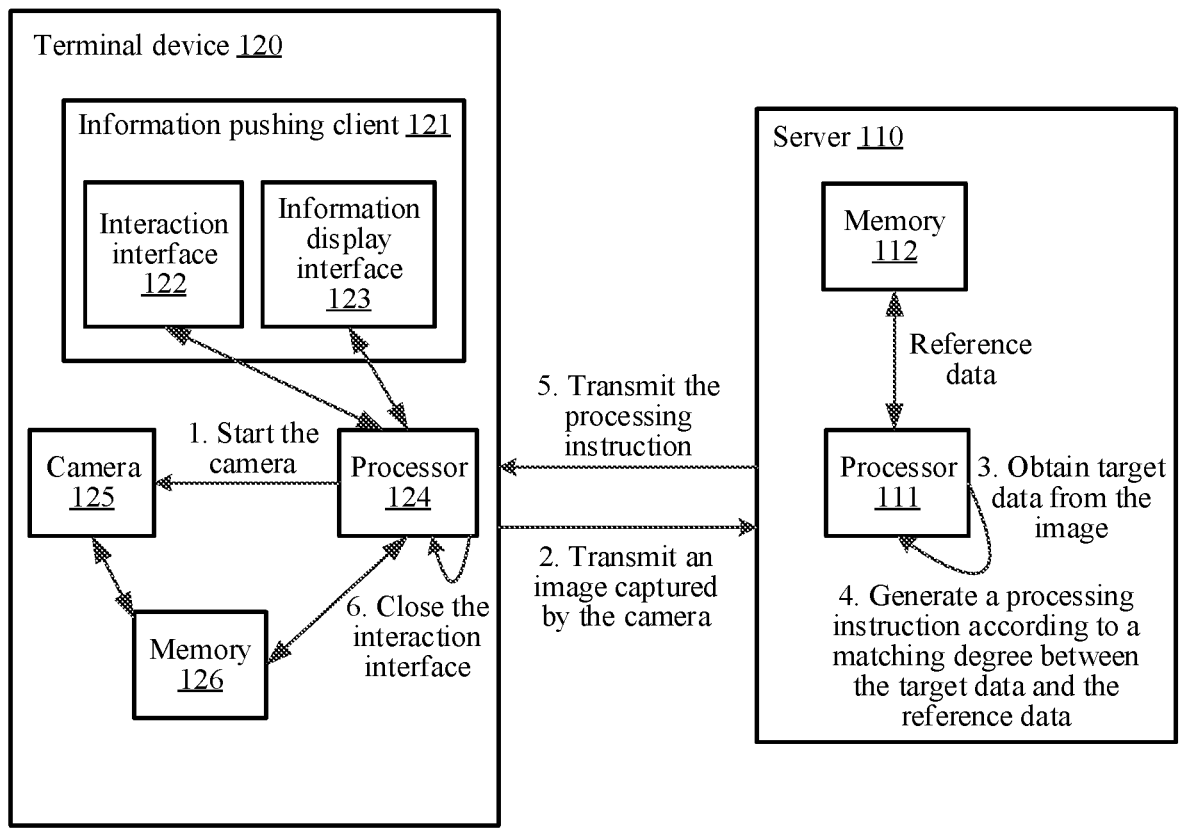
FIG. 4C is a diagram of an application scenario of an information pushing method according to an exemplary embodiment.

FIG. 4C is a diagram of an application scenario of an information pushing method according to an exemplary embodiment.

As shown in FIG. 4C, the information pushing method includes the following steps:

Step 1. An information pushing client 121 starts a camera 125 in response to determining that a preset region in an interaction interface 123 is selected.

Step 2. The information pushing client 121 transmits an image captured by the camera 125 to a server 110.

Step 3. The server 110 parses the image according to a type of push information, to obtain target data included in the image.

Step 4. The server 110 generates a processing instruction according to a matching degree between the target data and reference data.

Specifically, the server 110 may parse the push information in advance, to determine the reference data corresponding to the push information, so that after receiving the target data, the server 110 compares the target data with the reference data, to determine the matching degree between the target data and the reference data, to further generate the processing instruction. In some embodiments of the present disclosure, the processing instruction is closing the interaction interface 123.

Step 5. The server 110 transmits the processing instruction to the information pushing client 121.

Step 6. The information pushing client 121 closes the interaction interface according to the processing instruction. Program code and data related to steps 1, 2 and 6 may be stored in a memory 126 of a terminal device 120. A processor 124 of the terminal device 120 may perform steps 1, 2, and 6.

A memory 112 of the server 110 may store program code and data related to steps 3 to 5. A processor 111 of the server 110 may perform steps 3 to 5.

Through the foregoing process, during information push, by means of interaction with a user, the user's awareness of push information is enhanced, the diversity of information push forms is enriched, and push effects and value of the push information are improved.

Apparatus embodiments of the present disclosure are described below, and may be used to perform the method embodiments of the present disclosure. For details not disclosed in the apparatus embodiments of the present disclosure, refer to the method embodiments of the present disclosure.

Figure 5:
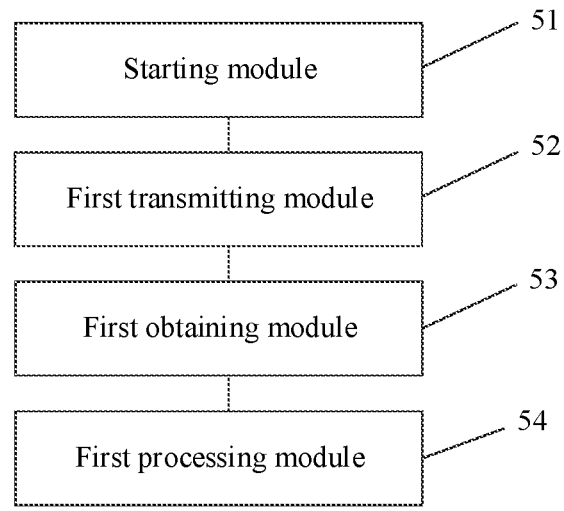
FIG. 5 is a structural block diagram of an information pushing apparatus according to an exemplary embodiment.

FIG. 5 is a structural block diagram of an information pushing apparatus according to an exemplary embodiment.

The information pushing apparatus shown in FIG. 5 may be, for example, an information pushing client 121 in FIG. 1A. The information pushing apparatus may include:

a starting module 51, configured to start a camera in a terminal in which a client is located in a case that a preset region in an interaction interface is selected, the interaction interface being displayed on an upper layer of an information display interface, and the information display interface being used for displaying push information;

a first transmitting module 52, configured to transmit an image captured by the camera to a server;

a first obtaining module 53, configured to obtain a processing instruction returned by the server; and a first processing module 54, configured to update at least one of the interaction interface and the information display interface according to the processing instruction.

Specifically, the information pushing apparatus provided in some embodiments of the present disclosure may be configured to perform the information pushing method provided in a first aspect of the embodiments of the present disclosure. The apparatus may be configured in any terminal such as a mobile phone or a computer, to implement information push.

In some embodiments, the first processing module 54 is specifically configured to:

update the interaction interface according to the processing instruction; or close the interaction interface and the information display interface according to the processing instruction.

The foregoing illustrations and descriptions of the embodiments of the information pushing methods shown in FIG. 1B and FIG. 2 are also applicable to the information pushing apparatus in some embodiments, and will not be repeated herein.

The information pushing apparatus provided in some embodiments of the present disclosure first starts the camera in the terminal in which the client is located in response to determining that the preset region in the interaction interface is selected, then transmits the image captured by the camera to the server, further obtains the processing instruction returned by the server, and finally processes the interaction interface and/or the information display interface according to the processing instruction. In this way, during information push, by means of interaction with a user, the user's awareness of push information is enhanced, the diversity of information push forms is enriched, and push effects and value of the push information are improved.

Figure 6:
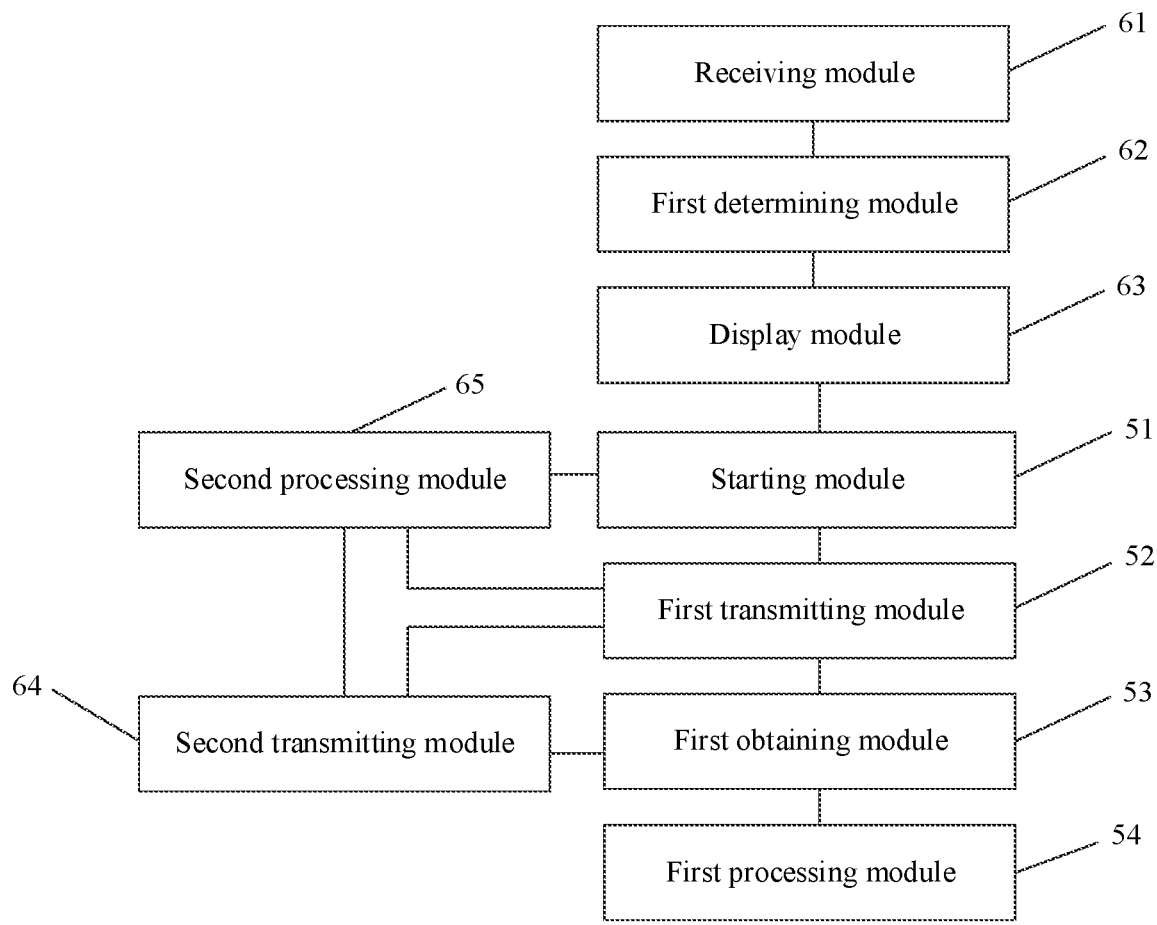
FIG. 6 is a structural block diagram of an information pushing apparatus according to another exemplary embodiment.

FIG. 6 is a structural block diagram of an information pushing apparatus according to another exemplary embodiment.

The information pushing apparatus shown in FIG. 6 may be, for example, the information pushing client 121 in FIG. 1A. The information pushing apparatus is based on the information pushing apparatus shown in FIG. 5 and may further include:

a receiving module 61, configured to receive a push instruction transmitted by a server, the push instruction including push information and a type corresponding to the push information;

a first determining module 62, configured to determine a target display mode of an interaction interface according to the type of the push information;

a display module 63, configured to display the push information on an information display interface, and display the interaction interface on an upper layer of the information display interface according to the target display mode;

a second transmitting module 64, configured to repeatedly transmit an image captured by the camera in real time to the server at a preset time interval in a case that the processing instruction returned by the server is not received; and a second processing module 65, configured to perform coding compression on the image captured by the camera.

The foregoing illustrations and descriptions of the embodiments of the information pushing methods shown in FIG. 1 and FIG. 2 are also applicable to the information pushing apparatus in some embodiments, and will not be repeated herein.

The information pushing apparatus provided in some embodiments of the present disclosure first starts the camera in the terminal in which the client is located in response to determining that the preset region in the interaction interface is selected, then transmits the image captured by the camera to the server, further obtains the processing instruction returned by the server, and finally processes at least one of the interaction interface and the information display interface according to the processing instruction. In this way, during information push, by means of interaction with a user, the user's awareness of push information is enhanced, the diversity of information push forms is enriched, and push effects and value of the push information are improved.

Figure 7:
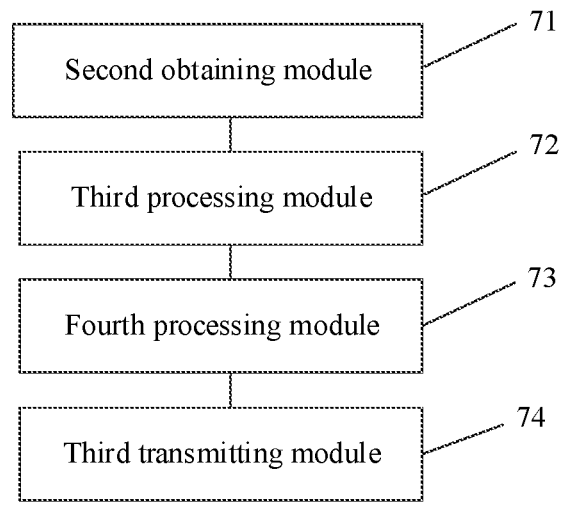
FIG. 7 is a structural block diagram of an information pushing apparatus according to another exemplary embodiment.

FIG. 7 is a structural block diagram of an information pushing apparatus according to another exemplary embodiment.

As shown in FIG. 7, the information pushing apparatus may be applied to, for example, the server 110 in FIG. 1A. The information pushing apparatus may include:

a second obtaining module 71, configured to obtain an image transmitted by an information pushing client;

a third processing module 72, configured to parse the image according to a type of push information currently displayed by the information pushing client, to obtain target data included in the image;

a fourth processing module 73, configured to generate a processing instruction according to the target data; and a third transmitting module 74, configured to return the processing instruction to the information pushing client.

Specifically, the information pushing apparatus provided in some embodiments of the present disclosure may be configured to perform the information pushing method provided in a second aspect of the embodiments of the present disclosure. The apparatus may be configured in a server, to implement information push.

In some embodiments, the third processing module 72 is specifically configured to:

determine a target type of to-be-obtained data according to the type of the push information; and parse the image to obtain target data corresponding to the target type.

The foregoing illustrations and descriptions of the embodiment of the information pushing method shown in FIG. 3 are also applicable to the information pushing apparatus in some embodiments, and will not be repeated herein.

The information pushing apparatus provided in some embodiments of the present disclosure first obtains the image sent by the information pushing client, then parses the image according to the type of the push information currently displayed by the information pushing client, to obtain the target data included in the image, further generates the processing instruction according to the target data, and finally returns the processing instruction to the information pushing client. In this way, during information push, by means of interaction with a user, the user's awareness of push information is enhanced, the diversity of information push forms is enriched, and push effects and value of the push information are improved.

Figure 8:
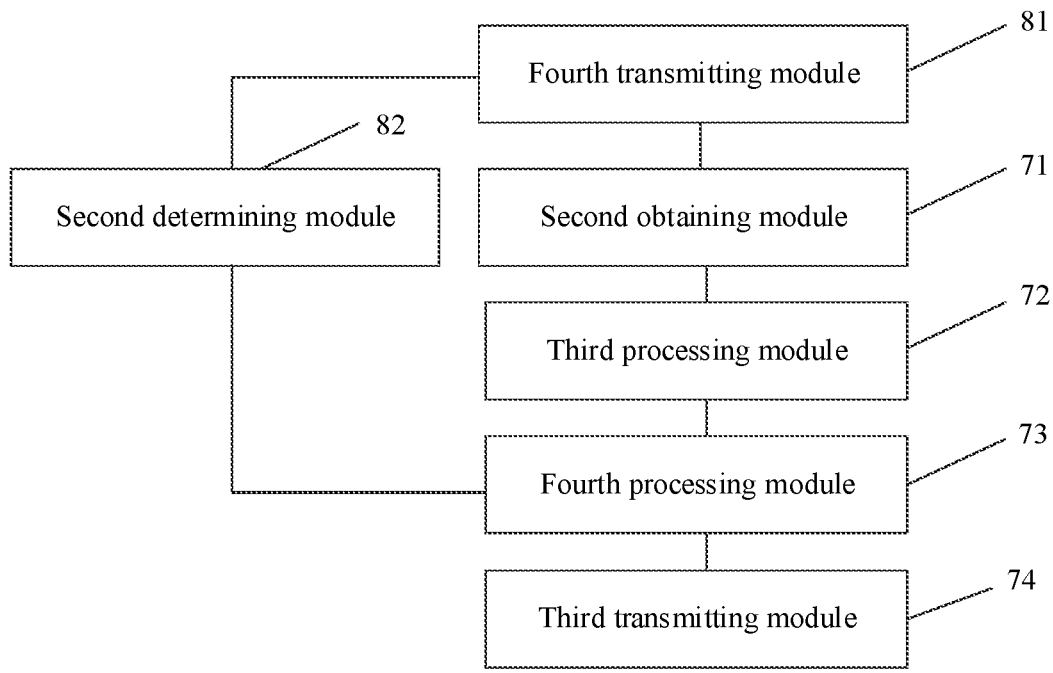
FIG. 8 is a structural block diagram of an information pushing apparatus according to another exemplary embodiment.

FIG. 8 is a structural block diagram of an information pushing apparatus according to another exemplary embodiment.

As shown in FIG. 8, the information pushing apparatus may be applied to, for example, the server 110 in FIG. 1A. The information pushing apparatus is based on the information pushing apparatus shown in FIG. 7 and may further include:

a fourth transmitting module 81, configured to transmit a push instruction to an information pushing client, the push instruction including push information and a type of the push information; and a second determining module 82, configured to parse the push information to determine reference data corresponding to the push information.

Correspondingly, the fourth processing module 73 is specifically configured to:

generate a processing instruction according to a matching degree between target data and the reference data.

The foregoing illustrations and descriptions of the embodiment of the information pushing method shown in FIG. 3 are also applicable to the information pushing apparatus in some embodiments, and will not be repeated herein.

The information pushing apparatus provided in some embodiments of the present disclosure first obtains the image sent by the information pushing client, then parses the image according to the type of the push information currently displayed by the information pushing client, to obtain the target data included in the image, further generates the processing instruction according to the target data, and finally returns the processing instruction to the information pushing client. In this way, during information push, by means of interaction with a user, the user's awareness of push information is enhanced, the diversity of information push forms is enriched, and push effects and value of the push information are improved.

A terminal is further provided in an exemplary embodiment, including:

a memory, a processor, a camera, and a computer program stored in the memory and executable on the processor, when being executed by the processor, the program implementing the information pushing method according to the first aspect of the embodiments.

Specifically, the information pushing method includes:

starting a camera in a terminal in which a client is located in a case that a preset region in an interaction interface is touched, the interaction interface being displayed on an upper layer of an information display interface, and the information display interface being used for displaying push information;

transmitting an image captured by the camera to a server;

obtaining a processing instruction returned by the server; and updating at least one of the interaction interface or the information display interface according to the processing instruction. In some embodiments, when the server determines that the image satisfies a preset requirement before a countdown of the preset duration (i.e., the preset duration originally designated for displaying the push information) ends, the terminal device may stop displaying the push information on the information display interface according to the processing instruction. In some embodiments, when the server determines that the image does not satisfy the preset requirement, the push information is displayed until the countdown of the preset duration ends. For example, when the countdown of the preset duration ends, the terminal device may close the interaction interface and the information display interface according to the processing instruction.

The foregoing illustrations and descriptions of the embodiments of the information pushing methods shown in FIG. 1B and FIG. 2 are also applicable to the terminal in some embodiments, and will not be repeated herein.

The terminal provided in some embodiments of the present disclosure first starts the camera in the terminal in which the client is located in response to determining that the preset region in the interaction interface is touched, then transmits the image captured by the camera to the server, further obtains the processing instruction returned by the server, and finally processes at least one of the interaction interface and the information display interface according to the processing instruction. In this way, during pushing information, by means of interaction with a user, the user's awareness of push information is enhanced, the diversity of information push forms is enriched, and push effects and value of the push information are improved.

In an exemplary embodiment, the server 110 may include:

a memory, a processor, and a computer program stored in the memory and executable on the processor, when being executed by the processor, the program implementing the information pushing method according to the embodiment shown in FIG. 3.

Specifically, the information pushing method includes:

obtaining an image transmitted by an information pushing client;

parsing the image according to a type of push information currently displayed by the information pushing client, to obtain target data included in the image;

generating a processing instruction according to the target data; and returning the processing instruction to the information pushing client.

The foregoing illustrations and descriptions of the embodiment of the information pushing method shown in FIG. 3 are also applicable to the server in some embodiments, and will not be repeated herein.

The server 110 provided in some embodiments of the present disclosure first obtains the image sent by the information pushing client, then parses the image according to the type of the push information currently displayed by the information pushing client, to obtain the target data included in the image, further generates the processing instruction according to the target data, and finally returns the processing instruction to the information pushing client. In this way, during information push, by means of interaction with a user, the user's awareness of push information is enhanced, the diversity of information push forms is enriched, and push effects and value of the push information are improved.

In an exemplary embodiment, a computer-readable storage medium storing a computer program is further provided, when being executed by a processor, the program implementing the information pushing method shown in FIG. 1B or FIG. 2.

Specifically, the information pushing method includes:

starting a camera in a terminal in which a client is located in a case that a preset region in an interaction interface is touched, the interaction interface being displayed on an upper layer of an information display interface, and the information display interface being used for displaying push information;

transmitting an image captured by the camera to a server;

obtaining a processing instruction returned by the server; and processing at least one of the interaction interface and the information display interface according to the processing instruction.

The foregoing illustrations and descriptions of the embodiments of the information pushing methods shown in FIG. 1B and FIG. 2 are also applicable to the computer-readable storage medium in some embodiments, and will not be repeated herein.

The computer-readable storage medium provided in some embodiments of the present disclosure first starts the camera in the terminal in which the client is located in response to determining that the preset region in the interaction interface is touched, then transmits the image captured by the camera to the server, further obtains the processing instruction returned by the server, and finally processes at least one of the interaction interface and the information display interface according to the processing instruction. In this way, during pushing information, by means of interaction with a user, the user's awareness of push information is enhanced, the diversity of information push forms is enriched, and push effects and value of the push information are improved.

In an exemplary embodiment, a computer-readable storage medium storing a computer program is further provided, when being executed by a processor, the program implementing the information pushing method shown in FIG. 3.

Specifically, the information pushing method includes:

obtaining an image transmitted by an information pushing client;

parsing the image according to a type of push information currently displayed by the information pushing client, to obtain target data included in the image;

generating a processing instruction according to the target data; and returning the processing instruction to the information pushing client.

The foregoing illustrations and descriptions of the embodiment of the information pushing method shown in FIG. 3 are also applicable to the computer-readable storage medium in some embodiments, and will not be repeated herein.

The computer-readable storage medium provided in some embodiments of the present disclosure first obtains the image sent by the information pushing client, then parses the image according to the type of the push information currently displayed by the information pushing client, to obtain the target data included in the image, further generates the processing instruction according to the target data, and finally returns the processing instruction to the information pushing client. In this way, during pushing information, by means of interaction with a user, the user's awareness of push information is enhanced, the diversity of information push forms is enriched, and push effects and value of the push information are improved.

In an exemplary embodiment, a computer program product is further provided, instructions in the computer program product, when being executed by a processor, implementing the information pushing method shown in FIG. 1B or FIG. 2.

Specifically, the information pushing method includes:

starting a camera in a terminal in which a client is located in a case that a preset region in an interaction interface is touched, the interaction interface being displayed on an upper layer of an information display interface, and the information display interface being used for displaying push information;

transmitting an image captured by the camera to a server;

obtaining a processing instruction returned by the server; and processing at least one of the interaction interface and the information display interface according to the processing instruction.

The foregoing illustrations and descriptions of the embodiments of the information pushing methods shown in FIG. 1B and FIG. 2 are also applicable to the computer program product in some embodiments, and will not be repeated herein.

The computer program product provided in some embodiments of the present disclosure first starts the camera in the terminal in which the client is located in response to determining that the preset region in the interaction interface is touched, then transmits the image captured by the camera to the server, further obtains the processing instruction returned by the server, and finally processes at least one of the interaction interface and the information display interface according to the processing instruction. In this way, during information push, by means of interaction with a user, the user's awareness of push information is enhanced, the diversity of information push forms is enriched, and push effects and value of the push information are improved.

In an exemplary embodiment, a computer program product is further provided, instructions in the computer program product, when being executed by a processor, implementing the information pushing method shown in FIG. 3.

Specifically, the information pushing method includes:

obtaining an image transmitted by an information pushing client;

parsing the image according to a type of push information currently displayed by the information pushing client, to obtain target data included in the image;

generating a processing instruction according to the target data; and returning the processing instruction to the information pushing client.

The foregoing illustrations and descriptions of the embodiment of the information pushing method shown in FIG. 3 are also applicable to the computer program product in some embodiments, and will not be repeated herein.

The computer program product provided in some embodiments of the present disclosure first obtains the image sent by the information pushing client, then parses the image according to the type of the push information currently displayed by the information pushing client, to obtain the target data included in the image, further generates the processing instruction according to the target data, and finally returns the processing instruction to the information pushing client. In this way, during pushing information, by means of interaction with a user, the user's awareness of push information is enhanced, the diversity of information push forms is enriched, and push effects and value of the push information are improved.

Figure 9:
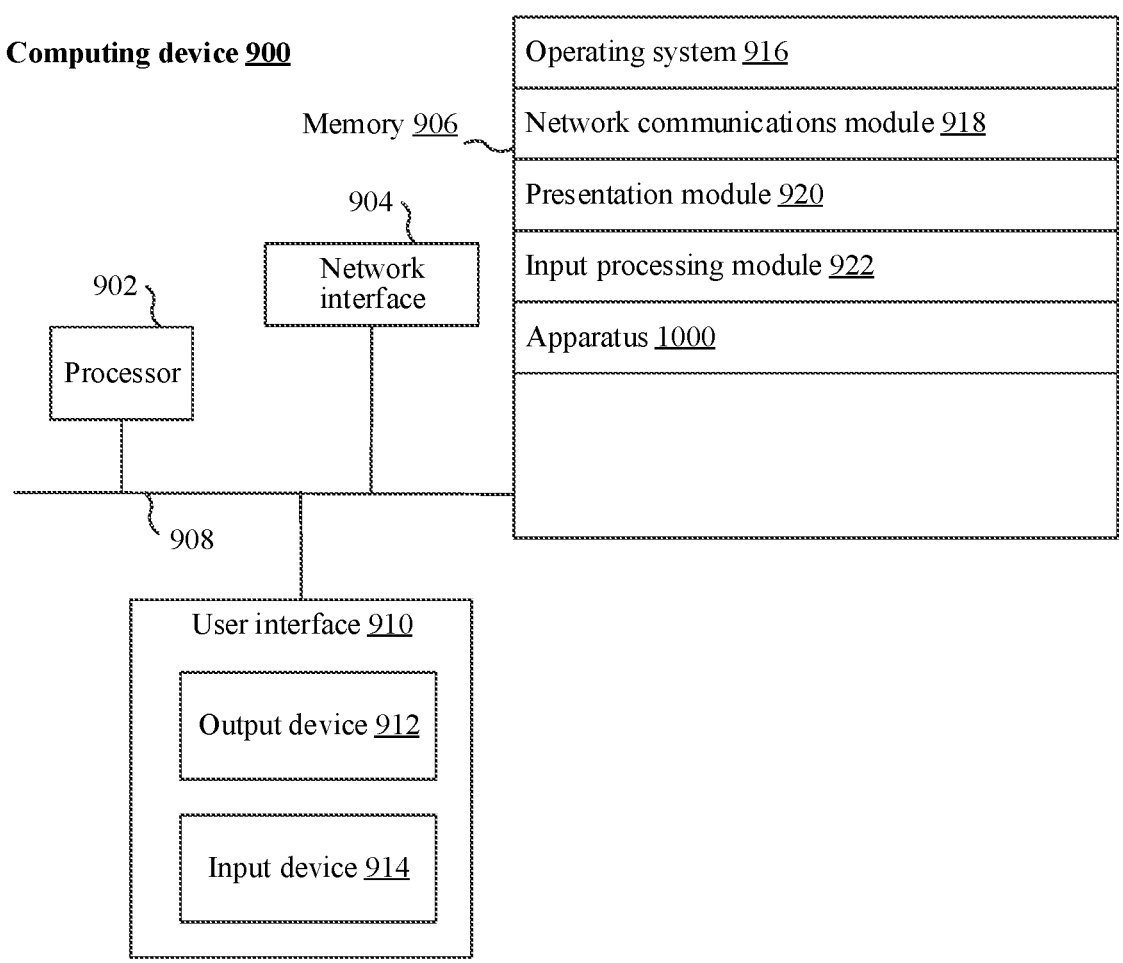
FIG. 9 is a block diagram of a computing device 900 according to some embodiments of the present disclosure.

FIG. 9 is a block diagram of an exemplary computing device 900 according to some embodiments. The computing device 900 herein may be the terminal device 120 or the server 110 in FIG. 1A. The computing device 900 herein may be provided by one or more computing devices including virtual and physical resources.

The computing device 900 typically includes one or more processing units (CPU) 902, one or more network interfaces 904, a memory 906, and one or more communications buses 908 (sometimes being referred to as chip sets) configured to interconnect these components. The computing device 900 may also include a user interface 910. The user interface 910 includes one or more output devices 912 enabling the presentation of media content, and the one or more output devices include one or more speakers and/or one or more visual displays. The user interface 910 also includes one or more input devices 914. The one or more input devices 914 include a user interface component that facilitates user's input, such as a keyboard, a mouse, a voice command input unit or a loudspeaker, a touchscreen display, a touch-sensitive panel, or another input button or control. When the computing device 900 implements the terminal of the present disclosure, the input devices 914 further include a camera.

The memory 906 includes a high-speed random access memory such as a dynamic random access memory (DRAM), a static random access memory (SRAM), a double data rate random access memory (DDR RAM), or other random access solid-state storage devices; and may further include a non-volatile memory such as one or more magnetic disk storage devices, optical disc storage devices, flash memory devices, or other non-volatile solid-state storage devices. The memory 906 or a non-volatile storage device in the memory 906 includes a non-volatile computer-readable storage medium. In some embodiments, the memory 906 or the non-volatile computer-readable storage medium of the memory 906 stores the following program, module, data structure, or a subset or superset thereof:

In some embodiments, the memory 906 may include an apparatus 1000. When the computing device 900 is implemented as the terminal of the present disclosure, the apparatus 1000 may perform the information pushing method in FIG. 1B or FIG. 2. When the computing device 900 is implemented as the server of the present disclosure, the apparatus 1000 may perform the information pushing method in FIG. 3.

An operating system 916 includes a program configured to process various basic system services and execute a hardware-related task.

A network communication module 918 is configured to connect to another computing device on a network by using one or more network interfaces 904 (wired or wireless) (for example, WiFi, Ethernet, a LAN, or a WLAN).

A presentation module 920 is configured to enable the presentation of information on the computing device 900 (for example, a user interface configured to run a computing device system and display content and information) by using one or more output devices 912 (for example, a display and a speaker) associated with the user interface 910.

An input processing module 922 is configured to detect one or more user inputs and interaction from one input device of the one or more input devices 914, and parse the detected input and interaction.

The foregoing units may be stored in one or more storage devices mentioned above, and correspond to an instruction set configured to execute the functions described above. The foregoing modules or programs (for example, the instruction set) are implemented without being used as independent software programs, processes, modules, or data structures. Therefore, various subsets of these modules may be combined or rearranged in various manners. In some embodiments, the memory 906 may store the subsets of the foregoing modules and data structures. Further, the memory 906 may store additional modules and data structures that are not described above.

The foregoing descriptions are merely embodiments of the present disclosure, but are not intended to limit the present disclosure. Any modification, equivalent replacement, or improvement made without departing from the spirit and principle of the present disclosure falls within the protection scope of the present disclosure. In the descriptions of the present disclosure, it is to be understood that the terms such as "first" and "second" are used only for the purpose of description, and are not intended to be understood as indicating or implying the relative importance or implicitly specifying the number of the indicated technical features. In view of this, a feature defined to be "first" or "second" may explicitly or implicitly include one or more features. In the descriptions of the present disclosure, "a plurality of" means two or more, unless otherwise definitely and specifically limited.

In the descriptions of this specification, descriptions with reference to the terms such as "an embodiment", "some embodiments", "an example", "a specific example", or "some examples" mean that a specific feature or characteristic that is described with reference to the embodiment or the example is included in at least one embodiment or example of the present disclosure. In this specification, schematic descriptions of the foregoing terms are not necessarily intended for the same embodiment or example. Besides, the specific features or characteristics that are described may be combined in a proper manner in any one or more embodiments or examples. In addition, in a case that no contradictory occurs, a person skilled in the art can integrate or combine different embodiments or examples that are described in this specification and features of the different embodiments or examples.

It is to be understood by a person skilled in the art of the embodiments of the present disclosure that any process or method that is described in a flowchart or in other manners herein may be understood as including one or more modules, segments, or parts including code of executable instructions for performing steps for implementing specific logical functions or processes, and the scope of exemplary implementations of the present disclosure includes other implementations in which functions may be performed in an order different from the shown or discussed order, including a substantially simultaneous order or a reverse order according to the related functions.

What is claimed is:

1. An information pushing method, performed by a terminal device, the method comprising:
    starting a camera in the terminal device upon detecting that a preset region in an interaction interface is selected, the interaction interface being displayed on an upper layer of an information display interface, and the information display interface being used for displaying push information and a predetermined display duration;
    transmitting an image captured by the camera to a server;
    obtaining a processing instruction returned by the server; and
    updating at least one of the interaction interface and the information display interface according to the processing instruction, wherein updating includes:
        in response to receiving feedback from the server indicating the image satisfies a preset requirement, stopping displaying the push information on the information display interface according to the processing instruction prior to expiration of a predetermined display duration; and
        in response to receiving feedback from the server indicating the image does not satisfy the preset requirement, continuing to display the push information until the predetermined display period ends.

2. The method according to claim 1, further comprising:
    displaying prompt information on the interaction interface, wherein the prompt information comprises: a photographing operation to be performed and an effect after the photographing operation is completed.

3. The method according to claim 1, wherein before the preset region in the interaction interface is selected, the method further comprises:
    receiving a push instruction transmitted by the server, the push instruction comprising the push information and a type corresponding to the push information;
    determining a target display mode of the interaction interface according to the type of the push information; and
    displaying the push information on the information display interface, and displaying the interaction interface on the upper layer of the information display interface according to the target display mode.

4. The method according to claim 3, wherein the type of the push information comprises text and an image; and the target display mode comprises a display position, a display size, and transparency of the interaction interface.

5. The method according to claim 1, further comprising:
    repeatedly transmitting, after the image captured by the camera is transmitted to the server, a follow-up image captured by the camera in real time to the server at a preset time interval, until the processing instruction returned by the server is received.

6. The method according to claim 1, further comprising:
    performing coding compression on the image captured by the camera before the image captured by the camera is transmitted to the server.

7. The method according to claim 1, wherein updating the at least one of the interaction interface and the information display interface according to the processing instruction comprises:
    displaying, on the interaction interface, a message indicating that an operation is successful in response to determining by the server that the image satisfies the preset requirement.

8. The method according to claim 1, wherein updating the at least one of the interaction interface and the information display interface according to the processing instruction comprises:
    closing the interaction interface and the information display interface according to the processing instruction when in response to determining by the server that the image does not satisfy the preset requirement.

9. The method according to claim 1, further comprising:
    displaying a countdown of the predetermined display duration; and
    stopping the countdown in response to receiving the feedback from the server that the image satisfies the preset requirement.

10. The method according to claim 1, further comprising:
    processing the image prior to the image's being transmitted to the server, the image is processed by:
    converting YUV data of the image into RGB data to reduce bandwidth costs of transmission over a network.

11. A terminal device, comprising: a memory, a processor, and a camera, the processor being configured to:
    start the camera upon detecting that a preset region in an interaction interface is selected, the interaction interface being displayed on an upper layer of an information display interface, and the information display interface being used for displaying push and a predetermined display duration;
    transmit an image captured by the camera to a server;
    obtain a processing instruction returned by the server; and
    update at least one of the interaction interface and the information display interface according to the processing instruction, wherein updating includes:
        in response to receiving feedback from the server indicating the image satisfies a preset requirement, stopping displaying the push information on the information display interface according to the processing instruction prior to expiration of a predetermined display duration; and
        in response to receiving feedback from the server indicating the image does not satisfy the preset requirement, continuing to display the push information until the predetermined display period ends.

12. The device according to claim 11, wherein the processor is further configured to:
    display prompt information on the interaction interface, wherein the prompt information comprises: a photographing operation to be performed and an effect after the photographing operation is completed.

13. The device according to claim 11, wherein the processor is further configured to:
    before the preset region in the interaction interface is selected, receive a push instruction transmitted by the server, the push instruction comprising the push information and a type corresponding to the push information;

determine a target display mode of the interaction interface according to the type of the push information; and display the push information on the information display interface, and display the interaction interface on the upper layer of the information display interface according to the target display mode.

14. The device according to claim 13, wherein the type of the push information comprises text and an image; and the target display mode comprises a display position, a display size, and transparency of the interaction interface.

15. The device according to claim 11, wherein the processor is further configured to:

repeatedly transmit, after the image captured by the camera is transmitted to the server, a follow-up image captured by the camera in real time to the server at a preset time interval, until the processing instruction returned by the server is received.

16. The device according to claim 11, wherein the processor is further configured to:

perform coding compression on the image captured by the camera before the image captured by the camera is transmitted to the server.

17. The device according to claim 11, wherein the processor is further configured to:

display, on the interaction interface, a message indicating that an operation is successful in response to determining by the server that the image satisfies the preset requirement.

18. The device according to claim 11, wherein the processor is further configured to:

close the interaction interface and the information display interface according to the processing instruction when in response to determining by the server that the image does not satisfy the preset requirement.

19. A non-transitory storage medium, storing a data processing program, the data processing program comprising instructions, the instructions, when being executed by a processor of a terminal, causing the processor to perform:

starting a camera in the terminal upon detecting that a preset region in an interaction interface is selected, the interaction interface being displayed on an upper layer of an information display interface, and the information display interface being used for displaying push information and a predetermined display duration;

transmitting an image captured by the camera to a server;

obtaining a processing instruction returned by the server; and updating at least one of the interaction interface and the information display interface according to the processing instruction, wherein updating includes:

in response to receiving feedback from the server indicating the image satisfies a preset requirement, stopping displaying the push information on the information display interface according to the processing instruction prior to expiration of a predetermined display duration; and in response to receiving feedback from the server indicating the image does not satisfy the preset requirement, continuing to display the push information until the predetermined display period ends.

20. The storage medium according to claim 19, wherein the instructions further cause the processor to perform:

repeatedly transmitting, after the image captured by the camera is transmitted to the server, a follow-up image captured by the camera in real time to the server at a preset time interval, until the processing instruction returned by the server is received.

* * * * *